United States Patent
Jansen et al.

(10) Patent No.: US 6,355,092 B1
(45) Date of Patent: Mar. 12, 2002

(54) APPARATUS AND METHOD FOR PERFORMING MEMBRANE GAS/LIQUID ABSORPTION AT ELEVATED PRESSURE

(75) Inventors: Albert Edward Jansen, Houten; Paul Hubert Maria Feron, Apeldoorn; Jan Hendrik Hanemaaijer, Oosterbeek; Piet Huisjes, Nijverdal, all of (NL)

(73) Assignee: Nederlandse Organisatie voor Toegepast-Natuurwetenschappelijk Ondersoek TMO, JA Delft (NL)

( * ) Notice: Subject to any disclaimer, the term of this patent is extended or adjusted under 35 U.S.C. 154(b) by 0 days.

(21) Appl. No.: 09/423,435

(22) PCT Filed: May 7, 1998

(86) PCT No.: PCT/NL98/00256

§ 371 Date: Nov. 9, 1999

§ 102(e) Date: Nov. 9, 1999

(87) PCT Pub. No.: WO98/51399

PCT Pub. Date: Nov. 19, 1998

(30) Foreign Application Priority Data

May 9, 1997 (NL) .............................................. 1006013

(51) Int. Cl.⁷ .......................... B01D 53/22; B01D 53/18
(52) U.S. Cl. ................. 95/45; 95/49; 95/51; 95/52; 95/231; 95/234; 95/235; 95/236; 96/4; 96/8
(58) Field of Search .............................. 95/44–56, 231, 95/234, 235, 236; 96/4–12

(56) References Cited

U.S. PATENT DOCUMENTS

| | | | | |
|---|---|---|---|---|
| 2,506,656 A | * | 5/1950 | Wallach et al. ................. | 95/52 |
| 3,911,080 A | * | 10/1975 | Mehl et al. ................. | 95/45 X |
| 3,976,451 A | * | 8/1976 | Blackmer et al. ............. | 95/54 X |
| 3,981,696 A | * | 9/1976 | Lalis et al. ....................... | 96/8 |
| 4,176,069 A | * | 11/1979 | Metz et al. .................. | 96/6 X |
| 4,268,279 A | * | 5/1981 | Shindo et al. .................. | 95/46 |
| 4,497,640 A | * | 2/1985 | Fournié et al. .............. | 95/52 X |
| 4,606,741 A | * | 8/1986 | Moreau et al. ................. | 95/49 |
| 4,750,918 A | | 6/1988 | Sirkar ............................ | 55/16 |
| 4,834,779 A | * | 5/1989 | Paganessi et al. ........... | 96/8 X |
| 4,900,448 A | * | 2/1990 | Bonne et al. ................. | 96/8 X |
| 4,915,838 A | * | 4/1990 | Bonne et al. ................. | 96/8 X |

(List continued on next page.)

FOREIGN PATENT DOCUMENTS

| | | | |
|---|---|---|---|
| DE | 43 08 697 | 9/1994 | |
| EP | 0430331 | * 6/1991 | .................... 95/50 |
| EP | 0 509 031 | 10/1992 | |
| EP | 0 521 495 | 1/1993 | |
| EP | 0524242 B1 | 12/1994 | |
| EP | 0871535 B1 | 1/2001 | |
| JP | 02-229529 | * 9/1990 | .................... 95/45 |
| WO | WO 91/09668 | 7/1991 | |
| WO | WO 95/26225 | 10/1995 | |
| WO | WO 95/35153 | 12/1995 | |

*Primary Examiner*—Robert H. Spitzer
(74) *Attorney, Agent, or Firm*—Browdy and Neimark PLLC

(57) ABSTRACT

The invention relates to an apparatus for performing membrane gas/liquid absorption at elevated pressure, comprising a pressure vessel in which a membrane unit is provided for separate feed-through of the gas phase and the liquid phase, in such a way that exchange of components to be absorbed can take place between the gas phase and the liquid phase, the flow direction of the gas phase through the absorber being essentially perpendicular to the flow direction of the liquid phase through the absorber. The invention further relates to a method for performing gas/liquid membrane absorption employing this absorber, in particular for the absorption of $CO_2$, $H_2S$, mercury (vapor) and/or water (vapor) from a gas phase at elevated pressure. The invention finally relates to a method for refining natural gas using the absorber and method according to the invention.

38 Claims, 2 Drawing Sheets

U.S. PATENT DOCUMENTS

| | | | | |
|---|---|---|---|---|
| 4,960,520 A | * | 10/1990 | Semmens | 95/50 X |
| 5,328,610 A | * | 7/1994 | Rogut | 95/45 X |
| 5,482,859 A | * | 1/1996 | Biller et al. | 96/8 X |
| 5,498,339 A | * | 3/1996 | Creusen et al. | 95/50 X |
| 5,525,144 A | * | 6/1996 | Gollan | 96/8 |
| 5,876,486 A | * | 3/1999 | Steinwandel et al. | 95/51 X |
| 5,888,273 A | * | 3/1999 | Buxbaum | 95/45 X |
| 5,954,858 A | * | 9/1999 | Peretti et al. | 95/45 X |
| 6,156,096 A | * | 12/2000 | Sirkar | 95/44 |

* cited by examiner

APPARATUS AND METHOD FOR PERFORMING MEMBRANE GAS/LIQUID ABSORPTION AT ELEVATED PRESSURE

CROSS REFERENCE TO RELATED APPLICATION

The present application is the national stage under 35 U.S.C. 371 of PCT/NL98/00256, filed May 7, 1998.

The present application relates to an apparatus and method for performing membrane gas/liquid absorption at elevated pressure.

FIELD OF THE INVENTION

BACKGROUND OF THE INVENTION

Methods for membrane gas/liquid absorption are known, for example from Applicant's patent applications mentioned below. These processes generally comprise the absorption of one or more gaseous components from a gas phase, the gas phase containing the components to be absorbed being brought into contact with a liquid phase, the gas phase and the liquid phase being kept separate by a membrane.

Membrane gas/liquid absorption is a very flexible and versatile technique, which can be used for specific absorption of diverse compounds from a gas phase, depending on, inter alia, the membrane used, the liquid phase used, and the gas stream to be cleaned. For example, membrane gas/liquid absorption can be used for specifically absorbing carbon dioxide and $H_2S$ (European application 0,751,815), oxidizable and reducible constituents such as mercury vapour (PCT application NL 96/00279), and also for removing water vapour (European application 0,524,242 by Applicant).

The known techniques have the drawback, however, that they cannot be applied to/with gas streams at elevated pressure, in particular pressures of more than 4 bar. Nevertheless it would be highly advantageous to be able to carry out membrane gas/liquid absorption at elevated pressure from the gas phase, particularly in those cases where the gas phase is provided at elevated pressure and where it is not possible/desirable, for technical and/or economical reasons, to reduce the gas stream pressure prior to the absorption process. An example of this is refining of natural gas which, as a rule, is produced, and has to be processed, at a pressure of more than 50 bar and sometimes 100 to 200 bar.

Existing membrane gas/liquid absorption techniques cannot, however, be applied to gas streams having such a high pressure, notably because:

- existing equipment for gas/liquid membrane absorption is not designed for such high pressures;
- existing membranes, particularly porous membranes, cannot be used if there is a pressure drop across the membrane;
- if "closed" membranes that can withstand a high(er) pressure drop (i.e. having a suitable thickness) are used, the mass transfer and consequently the capacity may become too low.

SUMMARY OF THE INVENTION

The invention therefore relates to an apparatus for performing membrane gas/liquid absorption at elevated pressure, comprising:

- a pressure vessel (1) which encloses an essentially closed chamber (2);
- means for supplying (3a) and discharging (4a) a gas phase to/from chamber (2);
- a membrane unit (5) disposed in chamber (2), comprising at least one membrane element (6) which defines a feed-through channel (7);
- means for supplying (8a) or discharging (9a) a liquid phase to the membrane unit (5), such that the liquid phase can be passed from inlet (8a) through feed-through channel (7) to outlet (9a);

wherein pressure vessel (1), inlet (3a) and outlet (4a) and membrane unit (5) are provided in such a way in chamber (2) that the gas phase can be directed past membrane element (6) in a flow direction essentially perpendicular to the flow direction of the liquid phase through membrane element (6), exchange of components to be absorbed being able to take place between the gas phase and the liquid phase through (the wall of) membrane element (6).

The invention further relates to a method for performing membrane gas/liquid absorption at elevated pressure for absorbing one or more components from a gas phase, employing the above-described apparatus, comprising

- feed-through of the gas phase comprising the one or more components to be absorbed, via inlet (3a) and outlet (4a) through chamber (2) past the one or more membrane elements (6), the gas phase having a pressure of more than 4 bar, preferably more than 10 bar, more preferably 50–200 bar;
- feed-through of a liquid phase suitable for absorbing the one or more components, via inlet (8a) and outlet (9a) through feed-through channel (7), the liquid phase having a pressure which differs from the gas phase pressure by not more than 5 bar, preferably not more than 0.5 bar;

in such a way that the one or more components to be absorbed are absorbed from the gas phase into the liquid phase through (the wall of) the one or more membrane elements (6), the gas phase and the liquid phase being kept separate by the membrane elements (6).

According to the invention, the membrane gas/liquid absorption is performed with so-called "cross-flow", i.e. the direction of the gas phase containing the one or more components to be absorbed is perpendicular to the plane of flow of the liquid phase.

Pressure vessel (1) is preferably essentially cylindrical or encloses an essentially cylindrical chamber (2). Whilst, in the operating position shown, the longitudinal axis of pressure vessel (1) is arranged essentially vertically, other setups are also possible, since membrane absorption is essentially independent of the orientation of the pressure vessel. These additional degrees of freedom regarding the set-up of the membrane absorber are an important advantage of membrane gas absorption compared with (for example) the use of packed columns which operate under the influence of gravity and therefore always have to be operated essentially vertically to achieve the desired counterflow.

Pressure vessel (1) may comprise guide means for controlling the flow of the gas phase through chamber (2).

Membrane element (6) has such a shape that it defines at least a feed-through channel (7). As such, membrane element (6) may consist of one membrane or of an assembly of a plurality of membranes, which form/enclose the feed-through channel; for example, membrane unit (5) may consist of planar membranes having transport channels, membranes that form a so-called "plate-and-frame" module or are in the form of spirally coiled membranes. Membrane element (6) is preferably in the form of a hollow fibre.

The membranes can be made of any suitable material which is at least permeable for the one or more gaseous constituents to be absorbed, but not for the gas phase and the liquid phase.

The membranes are preferably inert and able to withstand the gas phase and liquid phase used and the constituents to be absorbed, and are further selected on the basis of the intended use and further factors such as the desired mass transfer. In this context it is also possible to employ selective membranes.

The membranes can be either porous and nonporous, and can be asymmetric and/or coated membranes. It will be evident to those skilled in the art that, to achieve high mass transfer, porous membranes are to be preferred as a rule; these, however, are most sensitive to a pressure drop across the membrane.

Suitable membrane materials are known from the prior art, such as the abovementioned applications by Applicant, and comprise porous membranes such as polypropylene (PP), polyethylene (PE), poly(vinylidene fluoride) (PVDF), poly(tetrafluoroethylene) (PTFE) and polysulphone (PSU); nonporous membrane materials, asymmetric and/or coated membranes such as plasma membranes, membranes coated with siloxane rubbers (PDMS), membranes treated with fluorine, paraffin waxes and the like. Other suitable materials are, for example, ceramic membranes ($Al_2O_3$, $TiO_2$, $ZrO_2$), cellulose acetate (CA), butadiene rubber, EPDM (ethylene/propylene terpolymer); metallic membranes (e.g. Pd), poly (phenylene oxide) (PPO), polyimide (PI) and the like. Other materials will be obvious to those skilled in the art.

The membrane unit (5) comprises at least the one or more membrane elements (6) and possibly further means, such as guide elements for guiding the gas stream past the membrane elements (6), for example wall elements which enclose the membrane unit parallel to the gas flow direction; and/or connecting and distributing elements for distributing the (stream of the) liquid phase over the throughflow channels (7) of membrane elements which may, for example, be linked to, in particular form part of, the guide elements, as described below in more detail.

The membrane unit (5) preferably comprises an assembly of a plurality of hollow fibres which essentially run parallel, where the number of the hollow fibres and their total exchange area will depend on the capacity to be achieved.

In this context it is possible for various assemblies (modules) of hollow fibres to be used, which may or may not be operably connected to one another, with the option of the various assemblies of hollow fibres being at an angle with respect to one another, preferably an essentially perpendicular angle, all in planes perpendicular to the flow direction of the gas phase.

The flow direction of the gas phase past the membrane elements (6) is preferably essentially parallel to the longitudinal axis of pressure vessel (1), which means that the membrane elements (6) will be situated in a plane essentially perpendicular to the longitudinal axis of the pressure vessel (1).

The design of the absorber is preferably such that it is possible for the absorption process to be carried out as a countercurrent process, as will be known to those skilled in the art.

The membrane unit (5) is preferably a DAM module as described in the international application 91/09668 by Applicant, which is incorporated herein by reference.

Implementing the method of the invention involves passing the gas phase which contains the one or more components to be absorbed through chamber (2) past the membrane elements (6), a liquid phase suitable for absorbing the one or more components being passed, essentially simultaneously, through feed-through channel (7) of membrane element (6), in such a way that the one or more components to be absorbed are absorbed from the gas phase into the liquid phase, the gas phase and the liquid phase being kept separate by the (wall of) membrane elements (6).

During this process the gas phase in chamber (2) has a pressure of more than 4 bar, preferably more than 10 bar, more preferably 50–200 bar.

The pressure of the liquid phase in feed-through channels (7) will be essentially equal to the pressure of the gas phase in chamber (2), i.e. not differ therefrom by more than 5 bar, preferably not by more than 0.5 bar. Highly preferably, the liquid phase is at slight excess pressure relative to the gas phase, i.e. within the abovementioned range.

The pressure of the liquid phase will generally be set as a function of the pressure of the supplied gas phase, by means of suitable pressure controlling means. These pressure controlling means are preferably linked to, and are more preferably provided in, the absorber itself, more preferably to or in, respectively, pressure vessel (1), as is described below in more detail in the preferred embodiment.

The pressure controlling means are preferably such that they are able to respond suitably to changes in the pressure of the liquid phase, i.e. that they are able to compensate for such a pressure change by a corresponding change in the pressure of the liquid phase, without the integrity of the process and/or the equipment used being affected.

An advantage of the invention is that the membrane elements (6) and the membrane unit (5) as such need not be suitable for use at high pressure or pressure drop. Pressure vessel (1) and the further connections and the like do, however, have to be able to withstand the pressure of the gas phase and liquid phase, as will be obvious to those skilled in the art.

A further advantage of the (design of the) absorber according to the invention is, for example, that the pressure vessel can readily be filled and the membrane unit can readily be replaced, inter alia as a result of the modular structure. This leads to fewer operations in the course of maintenance and replacement.

The high-pressure membrane absorber according to the invention can be used for performing any gas/liquid absorption processes known per se at elevated pressure of the gas phase, in particular known membrane gas/liquid absorption processes, for example the $CO_2/H_2S$ absorption of the European application 0,751,815 by Applicant, the oxidative membrane gas/liquid absorption of the international application NL 96/00279 by Applicant, and the water vapour removal of the European application 0,524,242 by Applicant, whose contents are incorporated herein by reference.

In this context, said processes will, as a rule, be carried out in a manner similar to that of the known processes, i.e. using essentially the same membrane materials, liquid phases, absorption media, regeneration techniques for the liquid phase and the like. The invention therefore makes it possible for these known processes to be adapted, in a simple manner, for use at elevated pressure of the gas phase, by using the apparatus and method described herein, and the uses of these known processes at elevated pressure form preferred aspects of the invention.

DETAILED DESCRIPTION OF THE INVENTION

According to a specific embodiment, the absorber may also comprise at least two separate membrane units (5), which can be used for a plurality of identical or different liquid phases being fed simultaneously through the membrane elements (6) linked to these membrane units. Said separate membrane units in this arrangement will each effectively be connected to corresponding separate means for supplying (8a) or discharging (9a) the respective liquid phases. This embodiment makes it possible, inter alia, by employing a plurality of suitable liquid phases different from one another, to subject a gas phase in a single absorber simultaneously to different absorption processes for the simultaneous removal of different gaseous components, moreover providing the option of these absorption processes being controlled separately.

In this embodiment, said separate membrane units (5) may form part of a single design in the absorber, as long as it is possible for the different liquid phases to be passed, independently of one another, through the separate membrane units.

It is also possible for a plurality of membrane gas/liquid absorbers according to the invention to be connected in series, for example using the same absorption fluid to increase the efficiency of the removal, or using different absorption fluids to remove different components in series.

The liquid phase containing the components absorbed from the gas phase can be regenerated in accordance with processes known per se and can be reused for absorption. Thus the invention can be used in a closed liquid-phase circuit, optionally provided with suitable pumping means, the liquid phase during a cycle passing through both an absorption step and a desorption step. The desorption/regeneration step in this process can be carried out at the same liquid-phase pressure as the absorption step, using suitable equipment; in the process it is possible, if appropriate, in/for carrying out the desorption process, to advantageously utilize the elevated pressure of the liquid phase and/or the components incorporated therein, especially in the case of desorption of gaseous components, as will be obvious to those skilled in the art. Equally it is possible for the desorption to be carried out at a lower liquid-phase pressure (compared with the absorption step), with the option of suitable means for raising and lowering the liquid-phase pressure being incorporated in the liquid circuit.

According to a preferred aspect of the invention, which will be discussed below in more detail, it is possible for the (particularly gaseous) components absorbed from the gas phase to be desorbed/extracted during the desorption/regeneration step from the liquid phase as a gas (stream) having a higher (partial) pressure than the (partial) pressure at which the components were originally present in the gas phase, or even having a higher absolute pressure than the gas phase. This can take place by means of raising the desorption temperature. This so-called "pump effect" provides advantages, in particular, in refining natural gas according to the invention, as described below in more detail.

A further preferred aspect of the invention, which likewise will be described below in more detail, relates to a specific method for desorbing sulphur compounds absorbed into the liquid phase, in particular gaseous sulphur compounds such as, in particular, $H_2S$, by means of a redox reaction, in the course of which the sulphur can, for example, be precipitated as a free compound.

Possible applications of the membrane gas/liquid absorber and method according to the invention are:

absorption of $CO_2$ from gas streams at high pressure such as fuel gas, natural gas and associated gas;

absorption of $H_2S$ from gas streams at high pressure such as fuel gas, natural gas and associated gas;

absorption of Hg from natural gas, petroleum (fractions) or natural gas condensates (hydrocarbons that are gaseous or provided in gaseous form);

absorption of mercaptans or acidic components from petroleum (fractions) or natural gas condensates (hydrocarbons that are gaseous or provided in gaseous form);

absorption of water (vapour) from natural gas, petroleum (fractions), LPG (hydrocarbons that are gaseous or provided in gaseous form);

extraction/refining of alkenes (ethylene, propylene, butylene, styrene), for example in petrochemical processes;

absorption and/or extraction of CO from synthesis gas or waste gases at high pressure.

According to a particular, highly suitable embodiment the invention is used for refining natural gas, in particular for removing constituents such as mercury, $CO_2$, $H_2S$ from natural gas and/or drying natural gas.

It is known that natural gas is produced at pressures of more than 50 bar, as a rule approximately 100–250 bar. Freshly produced natural gas contains considerable amounts of $CO_2$ (more than 10 bar), $H_2S$, Hg and water vapour.

Reducing the pressure of the natural gas prior to the membrane gas absorption process is technically difficult and uneconomic, partly because natural gas, after refining and in a subsequent step, has its pressure boosted or is liquefied, for example for the purpose of transport. This involves high(er) energy costs and investment costs (compressors and cryogenic processes) at a lower inlet pressure of the natural gas. Moreover, liquefaction of natural gas or propane (for LPG) can be carried out only with great difficulty if the initial gas contains considerable quantities of $CO_2$. A method for refining natural gas at high pressure, preferably the pressure at which the natural gas is produced from the field, is therefore highly desirable.

The invention therefore relates, in particular, to a method for refining a stream of natural gas at elevated pressure, wherein the stream of natural gas is selectively stripped of one or more gaseous impurities by absorption of the one or more impurities into a liquid phase, by employing an apparatus as described above or in accordance with a method as described above.

This aspect of the invention particularly relates to certain methods for refining natural gas where:

the impurity to be removed is $CO_2$ and/or $H_2S$, the liquid phase used being an aqueous solution of an absorption medium for $CO_2$ and/or $H_2S$. In this context, the membrane elements (6) preferably comprise hollow fibre membranes made of polypropylene, polyethylene, polysulphone, poly(vinylidene fluoride) or poly(tetrafluoroethylene) and the liquid phase is as described in the European application 0,751,815 by Applicant, i.e. an aqueous liquid having a surface tension at 20° C. of more than $60 \times 10^{-3}$ N/m, more preferably an aqueous solution of a water-soluble amino acid or salt of an amino acid, more particularly taurine, alanine, glycine, methylglycine, proline, dimethylglycine, a salt or a derivative thereof; or phosphate/carbonate salts or phenolate;

the impurity to be removed is mercury (vapour), the liquid phase used being an aqueous solution of an oxidant suitable for oxidizing mercury, as described in the international application NL 96/00279 by Applicant; and/or water (vapour) is removed, the liquid phase used being a hygroscopic salt solution as described in the European application 0,524,242, or a combination thereof, preferably implemented in a plurality of membrane absorbers connected in series, as described above.

Those skilled in the art will be able to ensure that the abovementioned absorption fluids are optimally adapted to the absorption of the constituents from natural gas.

With respect to refining natural gas, the invention additionally comprises a special aspect, viz. the extraction, during the desorption/regeneration process, at a higher (partial or absolute) pressure than the absolute pressure of the stream of natural gas and/or the partial pressure of the gaseous constituents in the stream of natural gas, of the gaseous constituents such as $CO_2$ and/or $H_2S$, in particular $CO_2$, absorbed from the stream of natural gas into the liquid phase. Said higher pressure makes it possible for the gas stream which is obtained from the absorption/regeneration process and which contains a predominant amount of $CO_2$ to be (re-)injected into the ground, for example into the gas field itself, this being considerably preferable, from an environmental point of view, to discharge into the atmosphere. The high-pressure gas stream obtained from the process can also be used in other ways known per se, especially in situ in the gas field or the refinery, for example as a displacement gas used underground, as an adiabatic refrigerant or for driving turbines.

In refining natural gas it is also possible, advantageously, to employ oxidative sulphur absorption as described herein.

BRIEF DESCRIPTION OF THE DRAWINGS

The application will now be discussed with reference to the appended FIGS. 1–3, all of which show embodiments of the membrane absorber according to the invention, without, however, limiting the invention in any way.

Figure 1:
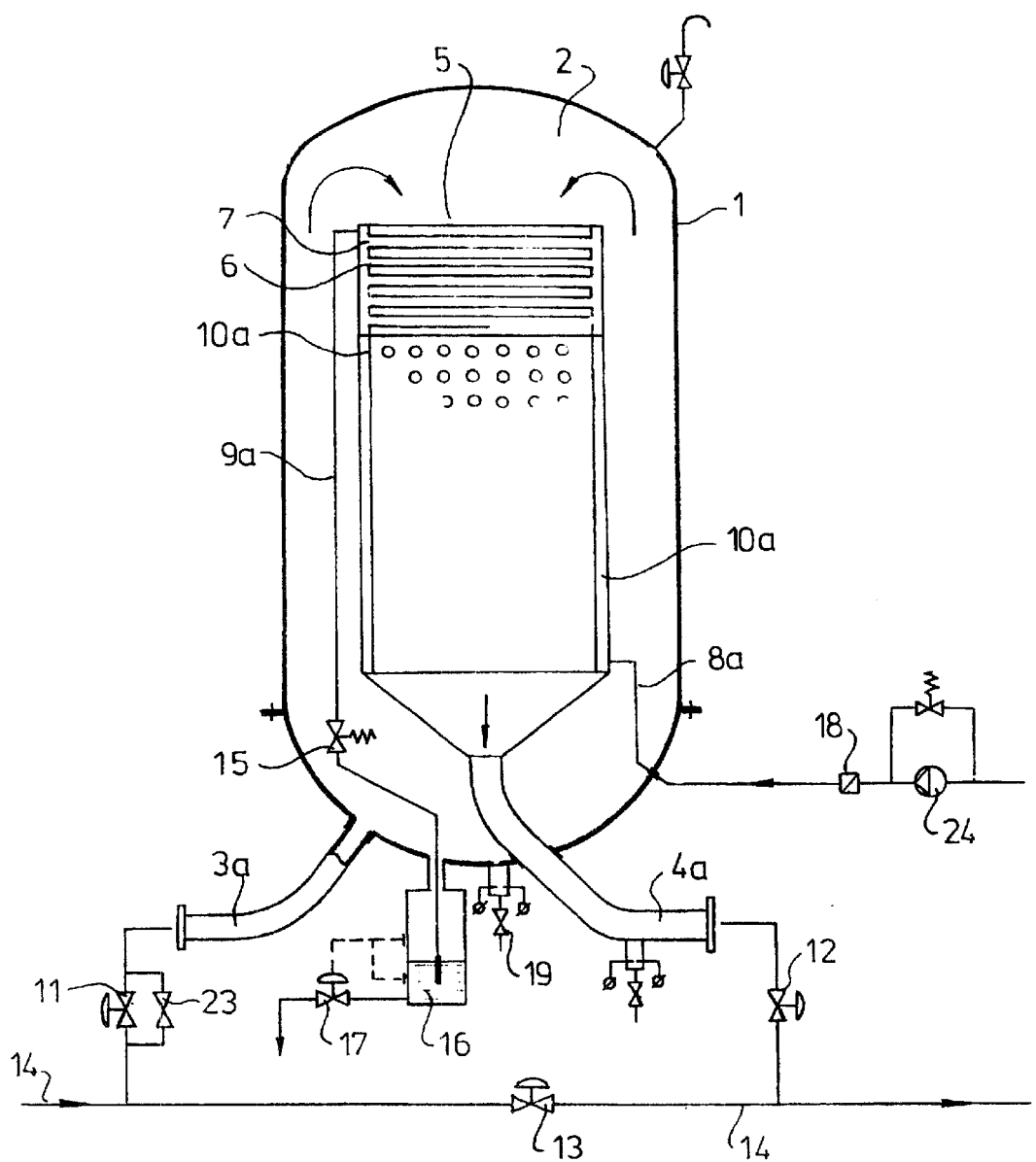
FIG. 1 shows an example of a membrane gas absorber according to the invention, where (1) is (the wall of) the pressure vessel which surrounds the chamber (2); (3a) is the gas-phase inlet; (4a) is the gas-phase outlet; (5) is the membrane unit, in the form of a DAM module according to the international application 91/09668 by Applicant; (6) is a membrane element in the form of a hollow fibre which defines a feed-through channel (7); (8a) is the liquid-phase inlet; (9a) is the liquid-phase outlet, (10a) and (10b) are the "module parts) of the module; (11), (12), (13), (17) and (23) are control means which can be shut off, such as a valve, (14) is a main for supplying the gas stream to the absorber, (15) is a pressure-dependent control means which can be shut off, such as a pressure control valve; (16) is a cylindrical vessel, (18) is a control means which can be shut off, such as a non-return valve (19) and (24) is a pumping means.

The gas phase is supplied, via supply line (3a), to chamber (2) in pressure vessel (1) which, in the operating position, is essentially arranged vertically. The gas flows upwards past the DAM module (5) and from the top flows downwards through the DAM module (5) and is discharged via outlet (4a). Simultaneously, a liquid phase is supplied via inlet (8a) to the DAM module (5), i.e. to the "module part" (10a) of the module which, in the process, provides for distribution of the liquid stream over the feed-through channels (7) in the hollow fibres.

The hollow fibres in the DAM module are essentially located in a horizontal plane perpendicular to the flow direction of the gas stream through the module; the DAM module may comprise a plurality of modules which are connected to one another and whose hollow fibres are at an angle with respect to one another, preferably a perpendicular angle.

The liquid phase flows through the hollow fibres, around which the gas phase is flowing at the same time, the constituents to be absorbed being absorbed from the gas phase into the liquid phase through the wall of the hollow fibres. The liquid phase is then discharged via line (9a), possibly via a further "module part" (10a), serving as an outlet, of the DAM module (5). In this arrangement the inlet (8a) and the outlet (9a) are connected in such a way to the DAM module (5) and its "module parts" (10) serving as inlet and outlet, that the absorption process takes place as a countercurrent process, in the present case as a result of the liquid phase being supplied to the bottom of the DAM module via inlet (8a) and being discharged via outlet (9a) at the top, i.e. where the liquid phase first comes into contact with the gas phase.

Figure 2:
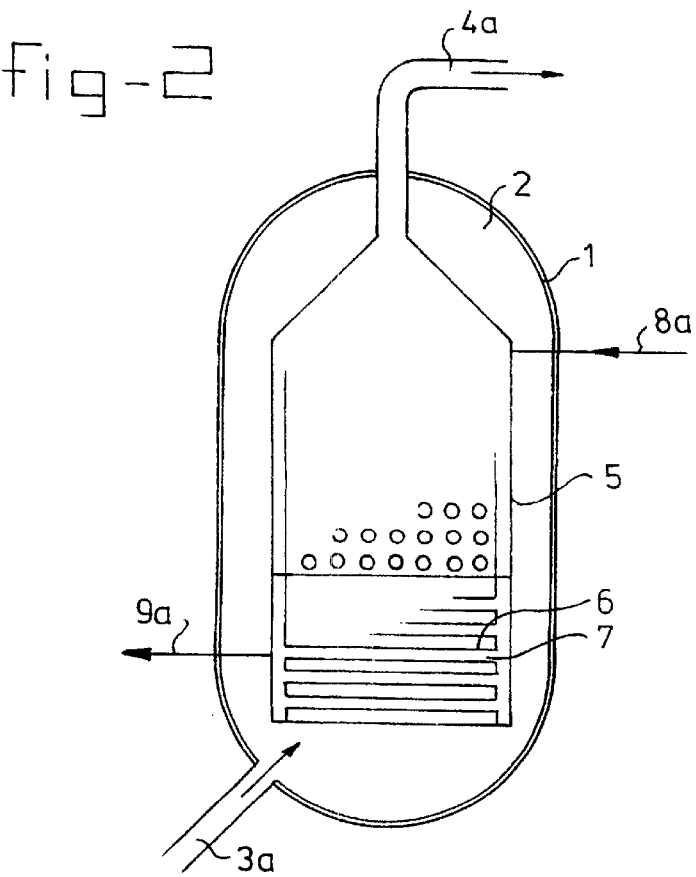

An alternative embodiment, where the gas outlet (4a) is located at the top of chamber (2), is depicted in FIG. 2. Here the gas phase flows upwards through the DAM module (5), and liquid inlet (8a) is located at the top, and liquid outlet (9a) at the bottom, of the DAM module, to permit countercurrent absorption.

It will be obvious to those skilled in the art that in the embodiments described herein the "walls" ("module parts") of the DAM module serve as guide means for guiding the gas stream, both past the outside (first embodiment) and past the inside through the module (first and second embodiments). This also makes it possible to regulate/control the flow of gas phase through chamber (2) and through the DAM module (5) and to carry out the process as a pure contercurrent process. It is also possible, however, to dispose further internal guide means in chamber (2) to permit at least partial recirculation of the gas stream exiting from the module.

Control of the above-described installation can be implemented, for example, as follows:

In the pressure vessel (1) there is a gas pressure of, for example, 200 bar. The gas enters via the line provided with a valve (11) and via inlet (3a) and leaves the pressure vessel (1) via outlet (4a) and via a line provided with valve (12). In this situation, line (14) will be shut off by means of valve (13). In the DAM module (5), the gas and the $CO_2$-absorbing liquid supplied by pump (24) via inlet (8a) are separated by membranes. This liquid is pumped from the bottom to the top through the module, so that air in the liquid is not given the chance to put any sections of the module out of action. After having flowed through the module, the liquid passes a simple spring-loaded pressure control valve (15), which is set to 0.5 bar, for example.

After this valve the liquid arrives in cylindrical vessel (16) in which the pressure is the same as in chamber (2). This cylinder (16) is fitted with level sensors which ensure that valve (17) keeps the liquid level between two values. The liquid is discharged by the gas pressure.

It is necessary, however, for the liquid pressure to be brought down stepwise (flash).

Instead of fault-prone level sensors it is also possible to use a float system. In the event of variations in the gas pressure, the spring-loaded valve (15) will maintain constant ΔP at all times.

If pump (24) fails, non-return valve (18) will close, the liquid system remains full, and after some time gas pressure and liquid pressure will be equal. The pump can therefore be stopped at any time. If liquid leaks to outside the module, it ends up in vessel (19) which is fitted with two electrodes which activate the alarm. In the event of liquid leaking inside the module, it ends up in vessel (20); this too will result in an alarm.

When an unpressurized and dry system is started up it is first necessary to run the pump (24) briefly until liquid is discharged. The liquid section is then full. The pump (24) can then be stopped and vessel (1) can be pressurized slowly with the aid of a shut-off valve. If the gas pressure is sufficient to force all the liquid from vessel (16), the pump can be restarted. The pressure can be raised to 200 bar, whereupon valves 911) and (12) can be opened and valve (13) can be closed.

Represented hereinabove is an absorption process according to the invention, wherein the gas phase flows at the outside of the hollow fibres and the liquid phase through (the lumen of the) hollow fibres.

According to an alternative embodiment of the invention, it is possible for the gas phase containing the components to be absorbed to be passed through the membrane elements (6), while the liquid phase flows around the membrane elements (6) on the outside. In this arrangement, the membrane elements and consequently the flow direction of the gas phase will be in a plane perpendicular to the flow direction of the liquid phase, to achieve the desired cross-flow, but the membrane elements will preferably be positioned essentially parallel to the axis of the pressure vessel. According to this preferred embodiment too, the membrane elements will preferably form a part of a membrane unit which, again, is preferably of modular design.

This embodiment may be preferable if, depending on the process to be carried out, excessive mass transfer barriers occur in the liquid phase when the liquid phase is passed through the fibres and the gas phase is passed over the fibres as described hereinabove. This may be the case, for example, with certain specific processes for $CO_2$ absorption.

According to this aspect of the invention it is possible to use an apparatus analogous to the above-described apparatus, the liquid phase being supplied to chamber (2) and passing through membrane module (5), whilst the gas phase is supplied independently to the membrane elements (6) and passes through channels (7). Other than that, this aspect of the invention can be implemented essentially analogously to the abovementioned, as will be obvious to those skilled in the art.

According to a preferred embodiment of this aspect, however, the gas phase is supplied once more to chamber (2) which in this arrangement is in gas contact with the feed-through channels (7) defined by membrane elements (6). The liquid phase is passed through a feed-through channel which is located in membrane unit (5), is independent of chamber (2) and is defined/enclosed by (the walls of) the membrane unit (5).

The membrane elements (6) run through this feed-through channel for the liquid phase, the membrane elements (6) being located in said feed-through channel in such a way that, during operation, there is a cross-flow of the liquid phase against the membrane elements (6).

The apparatus according to this embodiment of the invention therefore comprises:
a pressure vessel (1) which encloses an essentially closed chamber (2);
means for supplying (3b) and discharging (4b) a gas phase to/from chamber (2);
at least a membrane unit (5) which is located in chamber (2), wherein
the membrane unit (5) defines at least one essentially closed feed-through chamber (10d) for the liquid phase, said feed-through chamber being independent of chamber (2);
membrane unit (5) comprises at least one membrane element (6) which runs through the essentially closed feed-through chamber (10d) and defines a feed-through channel (7) which is essentially independent of the feed-through chamber (10d);
wherein membrane element (6) is effectively connected to chamber (2) in such a way that the gas phase from chamber (2) can be passed through feed-through channel (7);
means for supplying (8b) or discharging (9b) a liquid phase to the membrane unit (5), such that the liquid phase can be passed from inlet (8b) through feed-through chamber (10d) to outlet (9b);
wherein pressure vessel (1), inlet (3b) and outlet (4b) and in particular membrane unit (5), membrane elements (6), inlet (8b), outlet (9b) and chamber (10d) are provided in such a way that the liquid phase can be directed through chamber (10d) past/over membrane element (6) in a flow direction essentially perpendicular to the flow direction of the gas phase through membrane element (6), exchange being able to take place of components to be absorbed between the gas phase and the liquid phase through (the wall of) membrane element (6).

The method according to this embodiment of the invention, using the above-described apparatus, comprises
feed-through of a gas phase comprising the one or more components to be absorbed, via inlet (3b) and outlet (4b) through chamber (2) and feed-through channel (7) of membrane element (6), the gas phase having a pressure of more than 4 bar, preferably more than 10 bar, more preferably 50–200 bar;
feed-through of a liquid phase suitable for absorbing the one or more components, via inlet (8b) and outlet (9b) through feed-through chamber (10d) past the one or more membrane elements (6), the liquid phase having a pressure which differs from the gas phase pressure by not more than 5 bar, preferably not more than 1 bar;
in such a way that the one or more components to be absorbed are absorbed from the gas phase into the liquid phase through (the wall of) the one or more membrane elements (6), the gas phase and the liquid phase being kept separate by the membrane elements (6).

Other than that, this aspect of the invention can be implemented essentially analogously to the above, as will be obvious to those skilled in the art.

Figure 3:
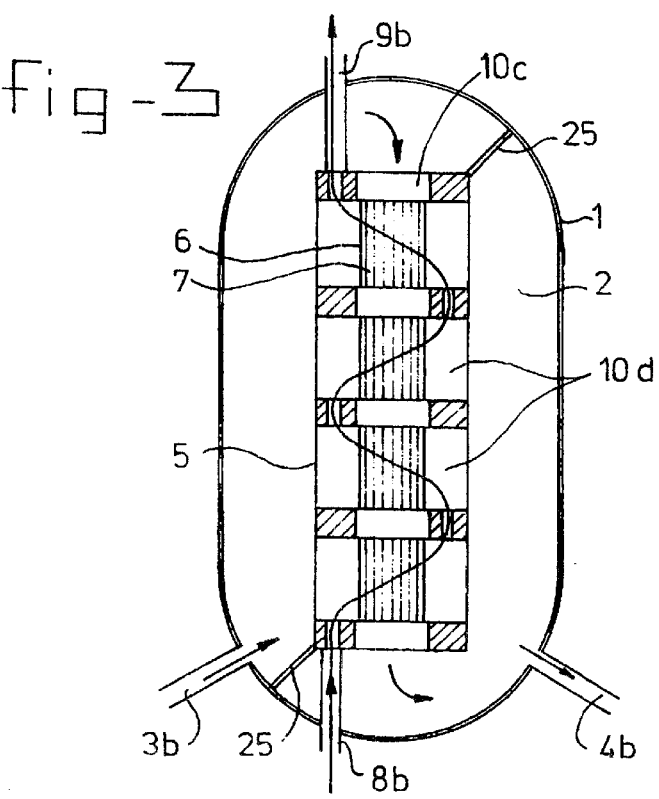

This last embodiment is explained schematically in more detail by the nonlimiting FIG. 3, where (1) is (the wall of) the pressure vessel which surrounds chamber (2); (3b) is the gas-phase inlet; (4b) is the gas-phase outlet; (5) is the membrane unit; (6) is a membrane element in the form of a hollow fibre which defines a feed-through channel (7); (8b) is the liquid-phase inlet; (9b) is the liquid-phase outlet, (10c) is a "module part" of the membrane unit (5) for distributing the gas stream over the membrane elements (6), (10d) are liquid-phase feed-through chambers which are in mutual liquid contact via "module parts" (10e), and (25) are guide means, disposed in chamber (2) for the gas stream.

The gas phase is supplied, via supply line (3b), to chamber (2) and then flows through the feed-through channels (7), the gas phase being distributed over the membrane elements (6) by module parts (10c). The gas phase then leaves the membrane module (5) to arrive in chamber (2) and is discharged via outlet (4b). In this arrangement, the chamber (2) will, as a rule, be provided with guide means for the gas stream, which ensure that the gas stream can be passed through the feed-through channels (7) in one direction and as a constant stream. In FIG. (3), these guide means, by way of example, are depicted as baffles (25).

Simultaneously, a liquid phase is supplied, via inlet (8b), to the essentially closed feed-through chambers (10d) and is then discharged via outlet (9b). These feed-through chambers (10d), which together form an essentially closed feed-through channel through the membrane module (5) in this arrangement are in liquid contact with one another and with inlet (8b) and outlet (9b) via "module parts". The flow of the liquid phase through the feed-through chambers (10d) in this arrangement is such that essentially there is cross-flow against the hollow fibres (6).

According to this embodiment, the gas phase therefore flows through the hollow fibres (6), which at the same time have the liquid phase flowing around them, the constituents to be absorbed being absorbed from the gas phase into the liquid phase through the wall of the hollow fibres. In this arrangement, the inlet (8b) and the outlet (9b) are preferably connected in such a way to membrane unit (5) and feed-through chambers (10d), that the absorption process can be implemented as a countercurrent process, in the figure as a result of the liquid phase being supplied via inlet (8b) to that side of the membrane unit (5) where the gas phase leaves the membrane module (5).

Possible modifications or adaptations of the abovementioned apparatuses and methods will be obvious to those skilled in the art and are within the scope of the invention.

What is claimed is:

1. Apparatus for performing membrane gas/liquid absorption at elevated pressure, comprising:
   a pressure vessel (1) which encloses an essentially closed chamber (2);
   inlet and outlet means respectively, for supplying (3a) and discharging (4a) a gas phase to/from said essentially closed chamber (2);
   a membrane unit (5) disposed in said essentially closed chamber (2), comprising at least one membrane element (6) which defines a feed-through channel (7); inlet and outlet
   means respectively, for supplying (8a) or discharging (9a) a liquid phase to the membrane unit (5), such that the liquid phase can be passed from said inlet means (8a) through said feed-through channel (7) to said outlet means (9a); wherein said pressure vessel (1), said inlet means (3a) and said outlet means (4a) and said membrane unit (5) are provided in such a way in said essentially closed chamber (2) that the gas phase can be directed past said membrane element (6) in a flow direction essentially perpendicular to the flow direction of the liquid phase through said membrane element (6), exchange being able to take place of components to be absorbed between the gas phase and the liquid phase through the wall of said membrane element (6).

2. Apparatus according to claim 1, wherein said membrane element (6) is in the form of a hollow fibre and wherein said membrane unit (5) includes at least an assembly of a plurality of hollow fibres, and optional guide elements for guiding the gas stream past the hollow fibres and/or distributing elements for distributing the stream of the liquid phase over the hollow fibres.

3. Apparatus according to claim 1, wherein the membrane elements (6) are located in a plane essentially perpendicular to the longitudinal axis of the pressure vessel (1) and—in operation—the flow direction of the gas phase through said chamber (2) past said membrane elements (6) is essentially parallel to the longitudinal axis of said pressure vessel (1).

4. Apparatus according to claim 1, wherein said pressure vessel (1) contains at least two separate membrane units (5) which are effectively connected to separate inlet and outlet means respectively, for supplying (8a) or discharging (9a) a liquid phase, for the purpose of feeding through, simultaneously and independently of one another, at least two separate liquid phases.

5. Apparatus according to claim 1, wherein the membrane elements (6) are composed of porous membranes.

6. Apparatus according to claim 1, further comprising means for controlling the pressure of the liquid phase relative to the gas phase.

7. Apparatus according to claim 1, comprising means for essentially smoothing the pressure of the gas phase and the liquid phase.

8. The apparatus according to claim 7 comprising means for maintaining the liquid phase at a controlled excess pressure of less than 0.5 bar relative to the gas phase.

9. Apparatus according to claim 1, comprising means for maintaining the liquid phase at a controlled excess pressure of less than 5 bar, relative to the gas phase.

10. Apparatus according to claim 1, wherein pressure controlling means are provided in, or are linked to, said pressure vessel (1).

11. Apparatus for refining natural gas at elevated pressure comprising at least two apparatuses according to claim 1, connected in series.

12. A method for performing membrane gas/liquid absorption at elevated pressure for absorbing at least one component from a gas phase, using an apparatus according to claim 1, comprising:
   feeding the gas phase comprising the at least one component to be absorbed via the inlet means (3a) and the outlet means (4a) through the chamber (2) past the one or more membrane elements (6), the gas phase having a pressure of more than 4 bar;
   feeding a liquid phase suitable for absorbing the at least one component via inlet means (81) and outlet means (9a) through the feed-through channel (7), the liquid phase having a pressure which differs from the gas phase pressure by not more than 5 bar;
   in such a way that the at least one component to be absorbed is absorbed from the gas phase into the liquid phase through the wall of the one or more membrane elements (6), the gas phase and the liquid phase being kept separate by said membrane elements (6).

13. The method according to claim wherein the gas phase has a pressure of more than 10 bar.

14. The method according to claim 13 wherein the gas phase has a pressure of from 50 to 200 bar.

15. The method according to claim 12 wherein the liquid has a pressure which differs from the gas phase pressure by not more than 1 bar.

16. The method according to claim 12 wherein at least two liquid phases are passed simultaneously and independently of one another through the at least two separate membrane units.

17. The method according to claim 16 wherein the two liquid phases are different from one another and are capable of absorbing different components.

18. Method according to claims 12, wherein the liquid phase is maintained at a controlled excess pressure of less than 5 bar.

19. The method according to claim 18 wherein the liquid phase is maintained at a controlled excess pressure of less than 0.5 bar relative to the gas phase.

20. The method according to claim 12 wherein the at least one component to be absorbed is selected from the group consisting of $CO_2$, $H_2S$, and mixtures thereof.

21. The method according to claim 12 wherein the at least one component to be absorbed is selected from the group consisting of oxidizable components and reducible components.

22. The method according to claim 12 wherein the at least one component to be absorbed is water vapor.

23. The method according to claim 12 wherein the gas is natural gas.

24. Method according to claim 23, wherein the membrane elements (6) comprise hollow fibre membranes made of polypropylene, polyethylene, polysulphone, poly (vinylidene fluoride) or poly(tetrafluoroethylene), and the liquid phase has a surface tension at 20° C. of more than $60 \times 10^{-3}$ N/m.

25. Method according to claim 23, wherein the liquid phase comprises an aqueous solution of a water-soluble amino acid or salt of an amino acid, a salt or a derivative thereof; or phosphate/carbonate salts or phenolate.

26. The method according to claim 25 wherein the water-soluble amino acid is selected from the group consisting of taurine, alanine, glycine, methylglycine, proline, dimethylglycine and salts and derivatives thereof.

27. Method according to claim 23, further comprising regenerating a liquid phase containing the absorbed $CO_2$, $H_2S$ and/or further absorbed constituents, to provide a stream of the desorbed gases, including $CO_2$, at partial or absolute pressure which is higher than the partial pressure of the constituents in the original phase and/or at a higher absolute pressure of the gas phase.

28. Method according to claim 23, wherein the impurity to be removed is mercury vapour, wherein the liquid phase used is an aqueous solution of an oxidant suitable for oxidizing mercury.

29. Method according to claim 23, for drying natural gas, wherein the liquid phase used is a hydroscopic salt solution.

30. The method according to claim 12 wherein the impurity to be removed is selected from the group consisting of $CO_2$, $H_2S$, and mixtures thereof and the liquid phase is an aqueous solution of an absorption medium for a gas selected from the group consisting of $CO_2$, $H_2S$, and mixtures thereof.

31. Method according to claim 12, wherein the liquid phase is an aqueous liquid phase.

32. Apparatus for performing membrane gas/liquid absorption at elevated pressure, comprising:

a pressure vessel (1) which encloses an essentially closed chamber (2);

inlet and outlet means respectively, for supplying (3b) and discharging (4b) a gas phase to/from said chamber (2);

at least one membrane unit (5) which is located in said chamber (2), wherein the membrane unit (5) defines at least one essentially closed feed-through chamber (10d) for the liquid phase, said feed-through chamber being independent of said chamber (2);

said membrane unit (5) comprises at least one membrane element (6) which runs through the essentially closed feed-through chamber (10d) and defines a feed-through channel (7) which is essentially independent of the feed-through chamber (10d);

wherein said at least one membrane element (6) is effectively connected to said chamber (2) in such a way that the gas phase from said chamber (2) can be passed through said feed-through channel (7);

inlet and outlet means respectively, for supplying (8b) or discharging (9b) a liquid phase can be passed from said inlet means (8b) through feed-through chamber (10d) to said outlet (9b);

wherein said pressure vessel (1), said inlet means (3b) and said outlet means (4b) and in particular said membrane unit (5), said membrane elements (6), said inlet means (8b), said outlet means (9b) and said chamber (10d) are provided in such a way that the liquid phase can be directed through said chamber (10d) past/over said membrane element (6) in flow direction essentially perpendicular to the flow direction of the gas phase through said membrane element (6), exchange being able to take place of components to be absorbed between the gas phase and the liquid phase through the wall of said membrane element (6).

33. Apparatus according to claim 32, wherein said membrane element (6) is in the form of a hollow fibre and wherein said membrane unit (5) includes at least an assembly of a plurality of hollow fibres, and optional guide elements for guiding the liquid phase past/over the hollow fibres and/or distributing elements for distributing the stream of the gas phase over the hollow fibres.

34. Apparatus according to claim 32, wherein the membrane elements (6) are located in a plane essentially parallel to the longitudinal axis of the pressure vessel (1) and—in operation—the flow direction of the liquid phase through chamber (2) past the membrane elements (6) is essentially perpendicular to the longitudinal axis of the pressure vessel (1).

35. A method for performing membrane gas/liquid absorption at elevated pressure for absorbing at least one component from a gas phase using an apparatus according to claim 32, comprising:

feeding a gas phase comprising the at least one component to be absorbed via said inlet means (3b) and said outlet means (4b) through the chamber (2) and the feed-through channel (7) or the membrane element (6), the gas phase-having a pressure of more than 4 bar;

feeding a liquid phase suitable for absorbing the at least one component through the inlet means (8b) and the outlet means (9b) through the feed-through chamber (10d), past the one or more membrane elements (6), the liquid phase having a pressure which differs from the gas phase pressure by not more than 5 bar;

in such a way that the at least one component to be absorbed is absorbed from the gas phase into the liquid phase through the wall of the one or more membrane elements (6), the gas phase and the liquid phase being kept separate by the membrane elements (6).

36. The method according to claim 35 wherein the gas phase has a pressure of more than 10 bar.

37. The method according to claim 36 wherein the gas phase has a pressure of from 50–200 bar.

38. The method according to claim 35 wherein the liquid phase has a pressure which differs from the gas phase pressure by not more than 1 bar.

* * * * *